(12) United States Patent
Wang et al.

(10) Patent No.: US 11,149,527 B2
(45) Date of Patent: Oct. 19, 2021

(54) STEEPLY-INCLINED ULTRA-THICK COAL SEAM GAS CONTROL METHOD BASED ON BINARY COMPOSITE LIQUID

(71) Applicant: SHANDONG UNIVERSITY OF SCIENCE AND TECHNOLOGY, Qingdao (CN)

(72) Inventors: Gang Wang, Qingdao (CN); Jianqiang Chen, Qingdao (CN); Lulu Sun, Qingdao (CN); Kunlun Liu, Qingdao (CN); Hao Xu, Qingdao (CN); Sanlong Zheng, Qingdao (CN); Xiangyu Tang, Qingdao (CN); Zhiyuan Liu, Qingdao (CN)

(73) Assignee: SHANDONG UNIVERSITY OF SCIENCE AND TECHNOLOGY, Qingdao (CN)

(*) Notice: Subject to any disclaimer, the term of this patent is extended or adjusted under 35 U.S.C. 154(b) by 0 days.

(21) Appl. No.: 17/264,962

(22) PCT Filed: Aug. 1, 2019

(86) PCT No.: PCT/CN2019/098773
§ 371 (c)(1),
(2) Date: Feb. 1, 2021

(87) PCT Pub. No.: WO2020/215521
PCT Pub. Date: Oct. 29, 2020

(65) Prior Publication Data
US 2021/0246767 A1 Aug. 12, 2021

(30) Foreign Application Priority Data
Apr. 24, 2019 (CN) .......................... 201910331280.7

(51) Int. Cl.
*C09K 8/70* (2006.01)
*E21B 43/00* (2006.01)
(Continued)

(52) U.S. Cl.
CPC ............ *E21B 43/006* (2013.01); *C09K 8/602* (2013.01); *C09K 8/70* (2013.01); *C09K 8/86* (2013.01);
(Continued)

(58) Field of Classification Search
CPC ..... E21B 43/006; E21B 43/267; C09K 8/602; C09K 8/70; C09K 8/86; C09K 2208/30
See application file for complete search history.

(56) References Cited

U.S. PATENT DOCUMENTS

2008/0142226 A1* 6/2008 Wilson .................... E21B 37/06
166/312
2016/0319188 A1* 11/2016 Loiseau ................... C09K 8/80
(Continued)

FOREIGN PATENT DOCUMENTS

CN 105419767 A 3/2016
CN 108559478 A 9/2018

OTHER PUBLICATIONS

International Search Report issued in corresponding International Application No. PCT/CN2019/098773; dated Jan. 22, 2020; State Intellectual Property Office of the P.R. China, Beijing, China, 7 pgs.
(Continued)

*Primary Examiner* — Alicia Bland
(74) *Attorney, Agent, or Firm* — Hauptman Ham, LLP

(57) ABSTRACT

A steeply-inclined ultra-thick coal seam gas control method based on a binary composite liquid. The method includes taking a clean fracturing fluid system and a microemulsion as a binary composite liquid. The method includes injecting the binary composite liquid into a coal mass by means of a
(Continued)

main hydraulic fracturing and permeability improvement method of hydraulic fracturing and water jet slotting to form a coal mass gas extraction system of binary composite liquid fracturing and permeability improvement. The method includes investigating and analyzing a gas control effect of the steeply-inclined ultra-thick coal seam according to change characteristics and analysis of gas extraction flow rate, change characteristics and analysis of permeability coefficient of coal seam, change characteristics and analysis of gas natural desorption speed of coal mass, change characteristics and analysis of gas concentration of return air flow of working face and theoretical analysis of drilling cuttings index.

4 Claims, 2 Drawing Sheets

(51) Int. Cl.
    *E21B 43/267*      (2006.01)
    *C09K 8/60*      (2006.01)
    *C09K 8/86*      (2006.01)

(52) U.S. Cl.
    CPC ........ *E21B 43/267* (2013.01); *C09K 2208/30* (2013.01)

(56) References Cited

U.S. PATENT DOCUMENTS

2017/0003263 A1*   1/2017   Huang .................... G01L 15/00
2018/0179877 A1*   6/2018   Marmorshteyn ....... E21B 43/26
2018/0209255 A1*   7/2018   Lin ....................... E21B 43/006

OTHER PUBLICATIONS

Written Opinion issued in corresponding International Application No. PCT/CN2019/098773; dated Jan. 22, 2020; State Intellectual Property Office of the P.R. China, Beijing, China, 7 pgs.

First Search Report issued in corresponding Chinese Application No. 2019103312807 (Publication No. 2019105242067); dated May 25, 2020; State Intellectual Property Office of the P.R. China, Beijing, China, 4 pgs.

First Office Action issued in corresponding Chinese Application No. 2019103312807 (Publication No. 2019105242067); dated Jun. 2, 2020; State Intellectual Property Office of the P.R. China, Beijing, China, 11 pgs.

Notification to Grant issued in corresponding Chinese Application No. 2019103312807 (Publication No. 2019105242067); dated Oct. 9, 2020; State Intellectual Property Office of the P.R. China, Beijing, China, 4 pgs.

Xia, Xue el al., "Effect of acid base on sodium dodecyl sulfate-n-butanol-kerosene-water microemulsion system", Petroleum Chemical Industry, Oct. 15, 2011, 5 pgs.

* cited by examiner

STEEPLY-INCLINED ULTRA-THICK COAL SEAM GAS CONTROL METHOD BASED ON BINARY COMPOSITE LIQUID

RELATED APPLICATIONS

The present application is a U.S. National Phase of International Application Number PCT/CN2019/098773, filed Aug. 1, 2019, and claims the priority of Chinese Application No. 201910331280.7, filed Apr. 24, 2019.

TECHNICAL FIELD

The present disclosure relates to the technical field of coal seam gas control, and in particular to a steeply-inclined ultra-thick coal seam gas control method based on a binary composite liquid.

BACKGROUND

China is a country with relatively rich coal resources. The coal industry has an important strategic position in national economy, and coal energy accounts for 60%-70% of primary energy. Therefore, coal will be the major energy of China for long. In a coal mining process, gas is a major risk factor in the coal mine that may cause disasters such as over-limit gas accumulation and coal and gas outbursts, thereby bringing hidden hazards to the safe production of the current coal mine. Most of coal seams in the main mining districts of Xinjiang in China are more than 8 min thickness and belong to steeply-inclined ultra-thick coal seams. With the increasing mining depth of the steeply-inclined ultra-thick coal seam, gas content, gas pressure and gas emission in a working face are increased. Further, special geological conditions and mining techniques of the steeply-inclined ultra-thick coal seams also contribute to the extremely complex gas disasters during mining. As a result, the gas disaster seems to become an important factor affecting the safe and efficient production of the steeply-inclined ultra-thick coal seams in the mining districts of Xinjiang.

At present, for gas problems encountered during the coal mining of the steeply-inclined ultra-thick coal seams with high gas and low permeability, it is required to perform efficiency extraction for gas in coal masses by increasing permeability and penetrability of the coal masses through hydraulic fracturing. Since some steeply-inclined ultra-thick coal masses have undeveloped and hard joint fissures, it is difficult to perform hydraulic fracturing for the coal seams, and thus an expected permeability improvement effect cannot be achieved. Further, with the increasing coal mining depth, it is more difficult to carry out hydraulic fracturing for the coal seams. When the hydraulic fracturing and permeability improvement technique is performed for the coal seams, a traditional fracturing fluid has a low viscosity and incomplete flowback, and thus will cause severe pollution to formations; the coal seam surface has hydrophobic and oleophilic properties, and a water-coal contact face has excessive large surface tension, so that water cannot spread normally on the coal seam surface, thereby causing problems such as difficulty in wetting the coal masses and unsatisfactory gas extraction effect of hydraulic fracturing and permeability improvement.

In summary, the prior art is to be further improved and developed due to lack of a set of rapid and efficient coal mine gas control technique and method for steeply-inclined ultra-thick coal seams.

SUMMARY

The object of the present disclosure is to provide a steeply-inclined ultra-thick coal seam gas control method based on a binary composite liquid. The method includes: firstly, developing an environment-friendly, clean and efficient binary composite liquid with a clean and non-flowback fracturing fluid and a novel efficient and wetting microemulsion as main; and then forming a rapid and efficient coal mass gas extraction promotion technology system of binary composite liquid fracturing and permeability improvement by means of the technical approaches such as high-pressure hydraulic slotting and fracturing. Thus, the method ensures safety of mining work and improves a gas control effect.

The technical solution of the present disclosure is described below.

A steeply-inclined ultra-thick coal seam gas control method based on a binary composite liquid includes the following steps.

At step a, a binary composite liquid including a clean fracturing fluid system and a microemulsion is prepared.

The clean fracturing fluid system uses a worm-like micelle formed by mixing a cetyl trimethyl ammonium bromide solution and a sodium salicylate solution as a fracturing fluid base solution, potassium chloride as a stabilizer, and a mixture of lubricating oil and water as a gel breaker.

A method of preparing the microemulsion includes: adding a sodium dodecyl sulfate (SDS) surfactant, an ethanol cosurfactant and kerosene into water; performing a centrifugation test according to the Young's equation and characterizing a wetting effect by a wetting contact angle; and selecting an ingredient blending ratio range at the time of the best effect of the microemulsion by comparing contact angles of water-coal, SDS-coal and emulsion-coal so as to determine the most appropriate microemulsion, and mixing the selected microemulsion with the clean fracturing fluid system into the binary composite liquid.

At step b, the binary composite liquid is injected into a coal mass by means of a main hydraulic fracturing and permeability improvement method of hydraulic fracturing and water jet slotting to form a coal mass gas extraction system of binary composite liquid fracturing and permeability improvement.

At step c, investigation and analysis are performed for a gas control effect of the steeply-inclined ultra-thick coal seam according to change characteristics and analysis of gas extraction flow rate, change characteristics and analysis of permeability coefficient of coal seam, change characteristics and analysis of gas natural desorption speed of coal mass, change characteristics and analysis of gas concentration of return air flow of working face and theoretical analysis of drilling cuttings index. In this way, the gas control of the steeply-inclined ultra-thick coal seam is realized.

As a preferable solution of the present disclosure, the concentration of the cetyl trimethyl ammonium bromide solution is 1%-5%, the concentration of the sodium salicylate solution is 0.5%-4.5%, and the addition amount of potassium chloride is 1%-5% of the weight of the fracturing fluid base solution.

As another preferable solution of the present disclosure, the method of determining the most appropriate microemulsion at step a is described below:

the SDS surfactant is ground and then added into a container holding warm distilled water, and then stirred thoroughly to complete dissolution of the SDS surfactant so as to prepare an SDS solution with a mass fraction being 1%;

ethanol, distilled water, the SDS solution and kerosene are mixed at a certain ratio at room temperature for 1 hour to allow the four substances to spontaneously form a transparent and homogenous microemulsion, where microemulsion synthesis is performed in batches according to the water-oil ratios of 2:1, 1:2 and 1:1 respectively to prepare the transparent microemulsions of oil-in-water (O/W) type, water-in-oil (W/O) type and bi-continuous type.

Coal sample preparation: raw coal is crushed and then pulverized using a pulverizer and then screened to obtain a coal powder with particle sizes being 20 meshes, 120 meshes and 325 meshes, 0.6 g of coal powder is weighed using a balance and then placed into a mould of a cake press and then compacted with a force of 20 Mpa to obtain a coal cake, and a plurality of to-be-tested coal cakes with different particle sizes are obtained by repeating the pressing procedure.

The wetting characteristics of the three-phase microemulsions are compared through centrifugation test and contact angle measurement in a laboratory to select a microemulsion with a small contact angle and the best wettability as the most appropriate microemulsion.

Further, at step b, the fracturing system in the hydraulic fracturing method includes a fracturing pump, a water tank, a pressure gauge, a stop valve, a flowmeter, a pressure sensor and a special borehole packer. The pressure sensor and the flowmeter are used to monitor a flow rate and an instantaneous pressure amount and an accumulative pressure amount in a pipe respectively, and the fracturing pump pumps water in the water tank into a borehole through the pipe.

Further, during water jet slotting, a drilling-cutting integrated drill bit is selected. The drilling-cutting integrated drill bit includes a drill rod, a reaming drill bit, a control device, a drill bit, a nozzle, a control valve and a water outlet. The control device is located between the reaming drill bit and the drill bit, the control valve is located in the control device, and the control device controls opening and closing of the pipe through the control valve.

Compared with the prior art, the present disclosure brings the following beneficial effects.

In the method of the present disclosure, the binary composite liquid with the clean fracturing fluid system and the novel microemulsion as main is developed and injected into the coal masses for application by means of the main hydraulic fracturing and permeability improvement technique of high-pressure hydraulic fracturing and water jet slotting, so as to extract the gas in the coal masses and carry out investigation and analysis for the extraction gas control effect of the steeply-inclined ultra-thick coal seam. The permeability improvement effect is investigated and analyzed in the following major aspects: change characteristics and analysis of gas extraction flow rate, change characteristics and analysis of permeability coefficient of coal seam, change characteristics and analysis of gas natural desorption speed of coal mass, change characteristics and analysis of gas concentration of return air flow of working face and theoretical analysis of drilling cuttings index. A rapid and efficient coal mass gas extraction promotion technology system of binary composite liquid fracturing and permeability improvement is formed to ensure the safety of the mining work and improve the gas control effect.

BRIEF DESCRIPTION OF THE DRAWINGS

The present disclosure is further described below in combination with accompanying drawings.

Figure 1:
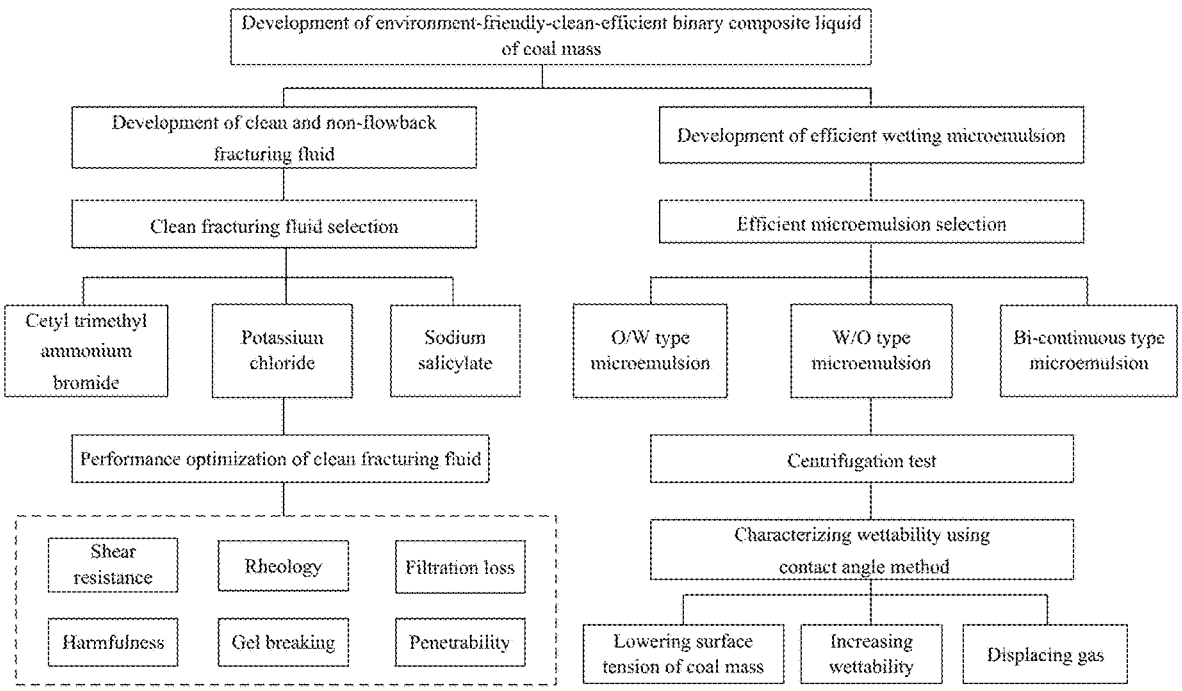
FIG. 1 is a flowchart illustrating preparation of a binary composite liquid according to an example of the present disclosure.

Numerals of the drawings are described as follows:
1—drill rod; 2—reaming drill bit; 3—control device; 4—drill bit; 5—nozzle; 6—control valve; 7—water outlet; 8—stop valve; 9—pressure gauge; 10—three-way pipe; 11—flowmeter; 12—pressure sensor; 13—principal machine; 14—electric motor; 15—gearbox; 16—connection piece; 17—fracturing pump; 18—unloading valve; 19—underground water supply pipe; 20—water tank; 21—quick capsule borehole packer; 22—high-pressure pipe.

DETAILED DESCRIPTION OF THE EMBODIMENTS

The present disclosure provides a steeply-inclined ultra-thick coal seam gas control method based on a binary composite liquid. To make the advantages and technical solutions of the present disclosure clearer, the present disclosure is described in detail below in combination with specific examples.

In the present disclosure, a steeply-inclined ultra-thick coal seam gas control method based on a binary composite liquid includes the following steps.

At step 1, for problems of the traditional fracturing fluid such as low viscosity, poor sand-carrying performance, formation pollution and complex flowback procedures, an ingredient blending ratio of a cationic viscoelastic surfactant-clean fracturing fluid with cetyl trimethyl ammonium bromide, potassium chloride and sodium salicylate as main and a gel breaking manner are preferably selected in the present disclosure to prepare a fracturing fluid system indoors and determine an ingredient blending ratio of the cationic viscoelastic surfactant-clean fracturing fluid system and a gel breaking scheme in an optimization test. The performances of the screened-out fracturing fluid system mainly including shear resistance, rheology, filtration loss, harmfulness, gel breaking, penetrability and the like are evaluated by instruments such as a viscometer, a filter tester and a contact angle meter. After indoor experimental evaluation and study are performed for the performances of the screened-out fracturing fluid system, a VES clean and non-flowback fracturing fluid system applicable to coal seam characteristics is determined to really improve the application effect of the existing traditional fracturing fluid.

At step 2, due to ultra-low surface tension of the microemulsion, the particle size of solution droplets is controlled to a nanometer level to improve wettability of the coal seams and displace gas. Components and blending ratios of the microemulsions of O/W type, W/O type and bi-continuous type are firstly determined in the present disclosure. There are many formulations for the microemulsion. Because of the hydrophobicity of coal, the microemulsion is prepared by adding an SDS surfactant, an ethanol cosurfactant and kerosene into water, so that the solution can more strongly spread over the coal surface due to its ultra-low surface tension when the coal seam is wetted, thereby achieving a better wetting effect. Next, a centrifugation test is performed according to Young's equation and a wetting effect is represented by a wetting contact angle. The ingredient blending ratio range at the time of best effect of the microemulsion is selected by comparing contact angles of water-coal, SDS-coal and emulsion-coal to determine the most appropriate microemulsion which is injected into a coal mass to achieve purposes of reducing the surface tension of the coal mass, increasing the wettability and displacing the gas.

At step 3, the binary composite liquid with the clean and non-flowback fracturing fluid and the novel microemulsion as main is injected into the coal mass by means of the main hydraulic fracturing and permeability improvement technique of high-pressure hydraulic fracturing and water jet slotting so as to form a key coal mass gas extraction technique system of binary composite liquid fracturing and permeability improvement. The major steps to be carried out on site include: drilling→hydraulic slotting→sealing with borehole packer→clean fracturing fluid→hydraulic fracturing→microemulsion injection→gas extraction.

At step 4, investigation and analysis are performed for the gas control effect of the steeply-inclined ultra-thick coal seam according to change characteristics and analysis of gas extraction flow, change characteristics and analysis of permeability coefficient of coal seam, change characteristics and analysis of gas natural desorption speed of coal mass, change characteristics and analysis of gas concentration of return air flow of working face and theoretical analysis of drilling cuttings index and the like, so as to finally achieve the efficient and rapid gas control effect of the steeply-inclined ultra-thick coal seam.

The steps of the present disclosure are specifically described below in combination with FIGS. 1-4.

In the present disclosure, the clean and non-flowback fracturing fluid (the clean fracturing fluid system) is developed in the following procedure: determining the blending ratio of the viscoelastic surfactant-clean fracturing fluid system and the gel breaking scheme through the indoor optimization experiment, and evaluating the performances of the screened-out fracturing fluid system by the instruments such as a viscometer, a filter tester and a contact angle meter and finally obtaining the clean and non-flowback fracturing fluid of the coal seam. As shown in FIG. 1, the fracturing fluid is obtained through the following steps.

At step 1, experimental materials such as cetyl trimethyl ammonium bromide (CTAB), sodium salicylate (NaSal), potassium chloride (KCl), sodium dodecyl sulfate (SDS), sodium persulfate ($Na_2S_2O_8$) and ammonium persulfate (($NH_4)_2S_2O_8$) were selected. Gasoline, diesel and lubricating oil with a main ingredient being a hydrocarbon mixture such as alkane, cycloalkane, aromatic hydrocarbon were needed for the experiment. Coal samples of the steeply-inclined ultra-thick coal seams of Xinjiang Wudong Coal Mine were selected, and the coal samples were collected on site from the coal mine, and then sealed and transported to a laboratory in time. Distilled water was used during the experiment, and all reagent materials did not require further purification.

At step 2, cetyl trimethyl ammonium bromide solutions C1 with different concentrations (1%, 2%, 3%, 4% and 5%) and sodium salicylate solutions C2 with different concentrations (0.5%, 1%, 1.5%, 2%, 2.5%, 3%, 3.5%, 4% and 4.5%) were prepared with the distilled water at room temperature, a solution of 400 ml was prepared by adding C2 with each concentration into C1 with each concentration, fully mixed and stirred for 2 minutes, and then sheared using a 12-speed rotary viscometer at a shear rate of 170 $s^{-1}$ for 20 minutes to measure and compare the apparent viscosity of each concentration ratio.

At step 3, the ratio of the fracturing fluid with a satisfactory viscosity was selected on the basis of step 2 to perform shear stability measurement and comparison. At room temperature, each fracturing fluid system of 400 ml prepared in step 2 was stirred for 2 minutes and then sheared by using the 12-speed rotary viscometer at the shear rate of 170 $s^{-1}$ for 2 hours to observe and record a viscosity change of each ratio during this period.

At step 4, to investigate the effect of anti-swelling agents with different concentrations, potassium chloride, on the viscosity of the fracturing fluid, six 400 ml fracturing fluids were prepared according to the concentrations of the screened-out fracturing fluid systems, five of which contained KCL of 1%, 2%, 3%, 4% and 5% sequentially; six fracturing fluids were sheared using the rotary viscometer at the shear rate of 170 $s^{-1}$ for 20 minutes to measure and compare their apparent viscosities.

At step 5, gel breaking schemes were made. In the first gel breaking scheme, gel breaking was performed for the fracturing fluid by selecting a conventional fracturing fluid gel breaker such as a strong oxidant and an anionic surfactant. Sodium persulfate, ammonium persulfate and sodium lauryl sulfate were added into three prepared 100 ml VES fracturing fluid systems respectively until the fracturing fluid was completely broken (viscosity <5 MPa s). Breaking time, breaking viscosity and breaking solution residue following gel breaking for the three fracturing fluid systems were tested. In the second gel breaking scheme where dilution breaking test was conducted for the VES fracturing fluid using water, dilution gel breaking was performed for 50 ml of prepared VES fracturing fluid using distilled water, that is, the distilled water of 50 ml, 100 ml, 150 ml, 200 ml, 250 ml, 300 ml, and the like was added into the VES fracturing fluid sequentially so as to test the corresponding viscosity of the diluted solution after each dilution during this period until the fracturing fluid was completely broken. The third gel breaking scheme was performed based on the second scheme: three prepared 50 ml VES fracturing fluids were diluted using distilled water to 100 ml respectively and tested for their viscosities, and equal amounts of gasoline, diesel and lubricating oil were added into the diluted solutions of the three fracturing fluids respectively to record the breaking times and the breaking viscosities of three diluted solutions until the fracturing fluid was completed broken, and the volumes of three oils required for completely breaking the VES fracturing fluid and the gel breaking time were tested.

At step 6, in combination with shortcomings of the application of the existing domestic fracturing fluid and the industrial standard SY/T5017-2005 "Performance Evaluation Method of Water-based Fracturing Fluid", the test of shear performance, rheological performance and gel breaking performance was performed using the ZNN-D12 rotary viscometer, the test of filtration loss performance was completed using a GGSD71 high-temperature and high-pressure filter tester, and the test of harming performance was completed using a centrifuge and an electric thermostatic drying oven. Specific compatibility and performance optimization were performed for the VES fracturing fluid system through a series of tests to select a fracturing fluid system most appropriate for the coal seams.

In the present disclosure, the novel, efficient and wetting microemulsion with ultra-low interfacial tension and stable thermodynamics is developed and injected into the coal mass to displace the gas so as to greatly improve the gas extraction effect. As shown in FIG. 1, the development of the microemulsion includes the following steps.

A. Experimental materials: anionic surfactant sodium dodecyl sulfate (SDS), kerosene, distilled water, 98% ethanol, and the like.

B. Experimental instruments: an ME104 electronic balance, a pulverizer, sieves of 20 meshes, 120 meshes and 325 meshes, a cake press, an injector, an optical contact angle meter and an NDJ-79 rotary viscometer.

C. Experimental scheme: the white powder of sodium dodecyl sulfate was ground and then added into a beaker holding warm distilled water, and stirred uniformly with a glass rod until the white powder was completely dissolved, so as to prepare an SDS solution of 1 wt %. Ethanol, distilled water, the SDS solution and kerosene were mixed at a certain ratio at room temperature for 1 hour to allow the four substances to spontaneously form a transparent and homogenous microemulsion, where the microemulsion synthesis was performed in batches according to the water-oil ratios of 2:1, 1:2 and 1:1 respectively to prepare transparent microemulsions of oil-in-water type (W/O type), water-in-oil type (O/W type) and bi-continuous type.

D. Coal sample preparation: raw coal was crushed and pulverized using a pulverizer, and then screened to obtain coal powder with particle sizes being 20 meshes, 120 meshes and 325 meshes. 0.6 g of coal powder was weighed using a balance, then placed into a mould of a cake press and then compacted with a force of 20 Mpa to obtain a coal cake and a plurality of to-be-tested coal cakes with different particle sizes are obtained by repeating the pressing procedure.

E. Characteristics such as wettability of the three-phase microemulsions were compared through the centrifugation test and the contact angle measurement in a laboratory to select a microemulsion with a small contact angle and the best wettability to displace the gas so as to guide underground engineering application.

Figure 2:
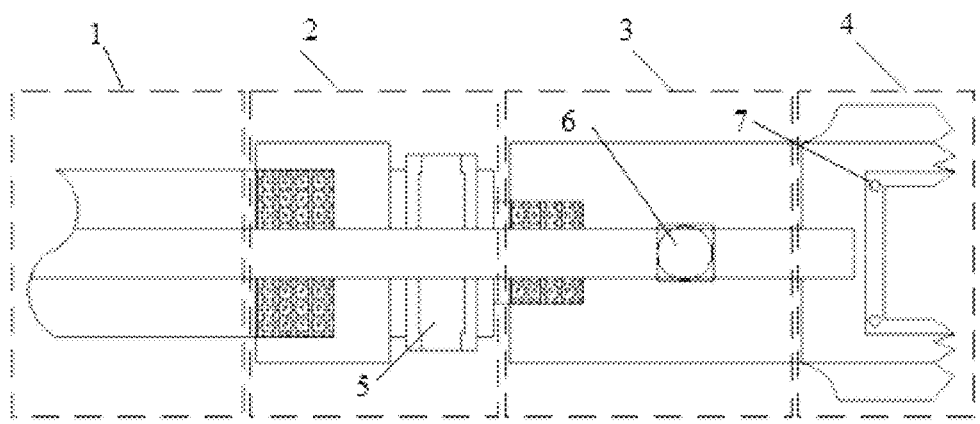
FIG. 2 is a schematic diagram illustrating a drilling-cutting integrated drill bit in hydraulic slotting according to an example of the present disclosure.

In the present disclosure, before hydraulic slotting is performed, drilling bit of the traditional hydraulic slotting is re-designed to enable the drill bit to have the functions of drilling and slotting, so as to reduce the bit-in and bit-out time. As shown in FIG. 2, the drilling-cutting integrated drill bit includes a drill rod 1, a reaming drill bit 2, a control device 3, a drill bit 4, a nozzle 5, a control valve 6 and a water outlet 7. The drilling-cutting integrated drill bit is different from an ordinary drill bit as follows: the control device 3 is provided between the reaming drill bit 2 and the ordinary drill bit. The control device 3 may control opening and closing of a pipe according to the control valve 6. When the pressure is low, the pipe is opened and when switching is performed to the high pressure, the device is started and the pipe is closed. During drilling, the system requires a low water pressure and the control device 3 does not work, so that water flows out of the drill bit 4 and the nozzle 5, which is same as the traditional drilling process. After drilling is completed, when the drill bit is retreated from the borehole, the water pressure of the system is increased, and the control device 3 is closed, so that the high-pressure water can only be ejected from the nozzle 5 to act on a coal wall so as to form a high-pressure cutting force. A circular crack will be formed in a direction perpendicular to the borehole after cutting.

Figure 3:
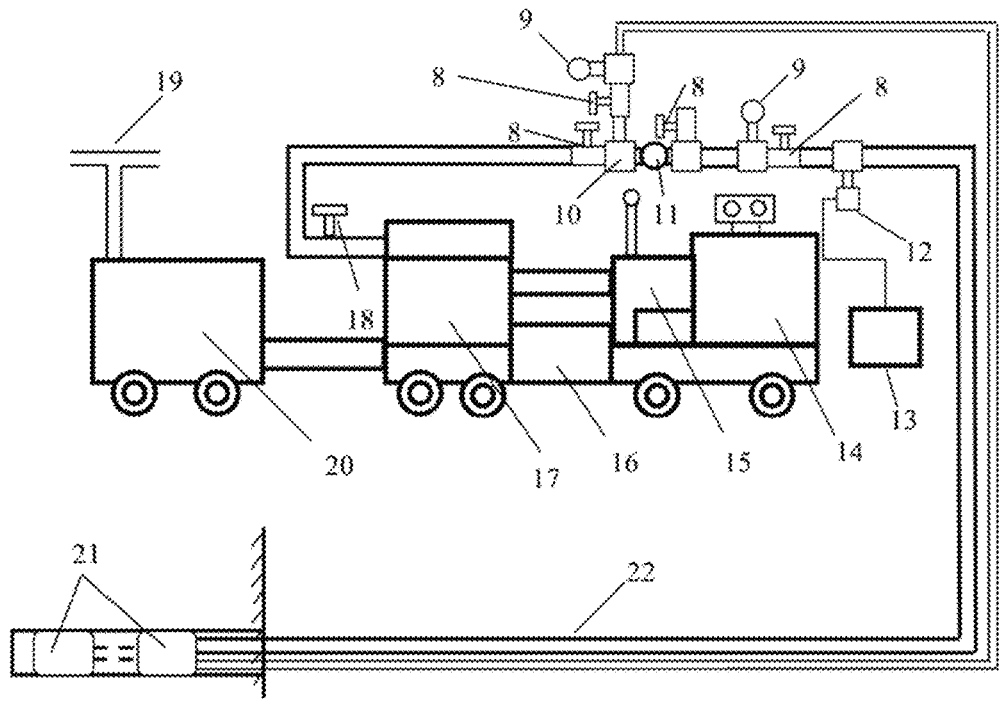
FIG. 3 is a schematic diagram illustrating arrangement of a hydraulic fracturing system according to an example of the present disclosure.
Figure 4:
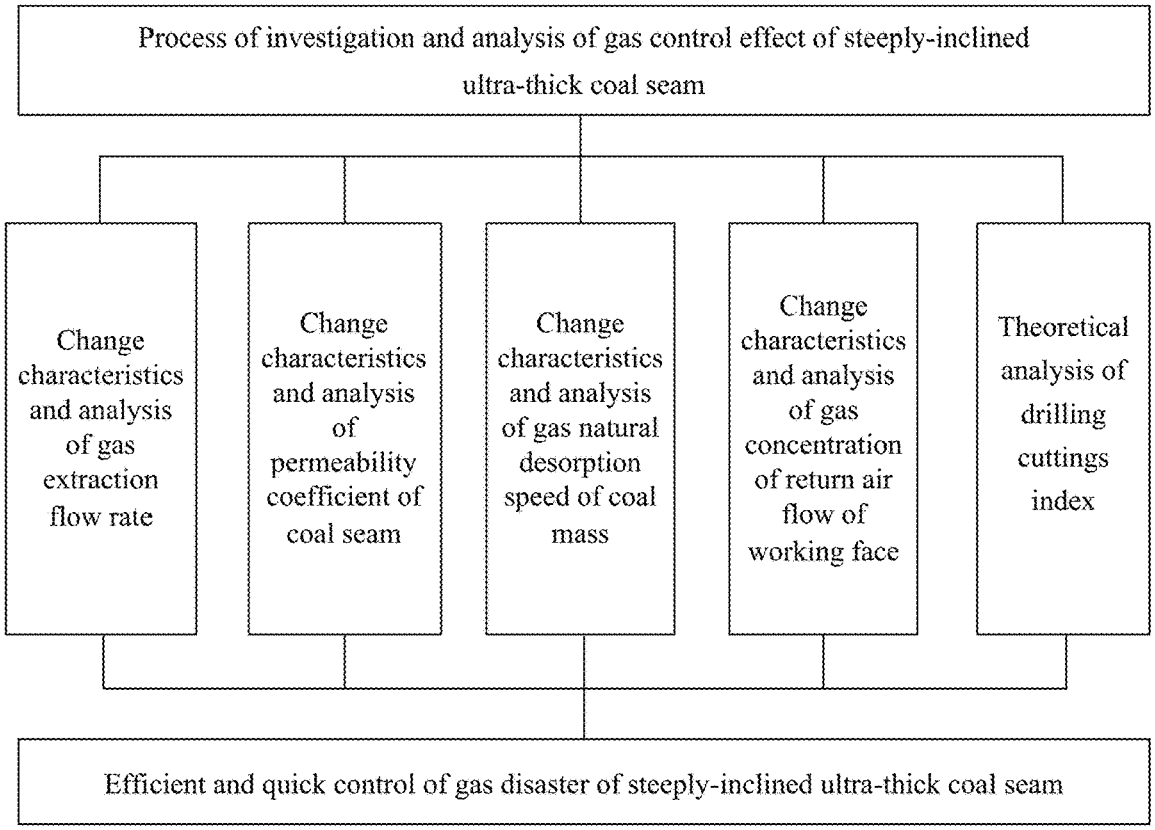
FIG. 4 is a schematic diagram illustrating a process of investigating and analyzing gas control effect of a steeply-inclined ultra-thick coal seam according to an example of the present disclosure.

In the present disclosure, before hydraulic fracturing is performed, the fracturing system is preliminarily designed according to the "Regulations for Designing and Construction of Underground Fracturing in Coal Mine". The fracturing system is arranged as shown in FIG. 3. The fracturing system mainly includes the following components: a stop valve 8, a pressure gauge 9, a three-way pipe 10, a flowmeter 11, a pressure sensor 12, a principal machine 13, an electric motor 14, a gearbox 15, a connection piece 16, a fracturing pump 17, an unloading valve 18, an underground water supply pipe 19, a water tank 20, a quick capsule borehole packer 21 and a high-pressure pipe 22. The pressure sensor 12 and the flowmeter 11 are used to monitor a flow rate, an instantaneous pressure amount and an accumulative pressure amount in a pipe. The control panels of the monitoring instrument and the fracturing pump 17 should be placed in a disaster-avoiding commander compartment. A water supply system and a power supply system are to be used for the fracturing system. Therefore, prior to arrangement of equipment a systematic investigation is firstly performed for an industrial loop network and an underground water supply pipe system of a mine to ensure complete water supply pipe and power supply line are provided at an equipment placement location. No equipment can be arranged within 50 m from a fracturing hole, and activities or operations of workers are prohibited within 80 m from the fracturing hole during fracturing. The fracturing pump 17 pumps water in the water tank 20 into the borehole through the high-pressure pipe 22 to fracture the coal mass with the high-pressure water. When the high-pressure pipe 22 is laid, bending is minimized to reduce a pressure drop of the pipe.

In the present disclosure, the binary composite liquid with the clean fracturing fluid system and the novel microemulsion as main is developed and injected into the coal mass for application by means of the main hydraulic fracturing and permeability improvement technique of high-pressure hydraulic fracturing and water jet slotting, so as to extract the gas in the coal mass and investigate and analyze the gas control effect of the steeply-inclined ultra-thick coal seam. The investigation and analysis are performed for the permeability improvement effect in the following major aspects: change characteristics and analysis of gas extraction flow rate, change characteristics and analysis of permeability coefficient of coal seam, change characteristics and analysis of gas natural desorption speed of coal mass, change characteristics and analysis of gas concentration of return air flow of working face and theoretical analysis of drilling cuttings index. The permeability coefficient of the coal seam indicates a difficulty of flowing of gas in the coal seam, which is measured by unstable radial flow method. After the borehole is opened, the gas in the coal seam flows toward the borehole and thus a gas flow field in the coal seam around the borehole belongs to an unstable radial flow field. The calculation formula of the coal seam permeability is as shown in Table 1.

TABLE 1

| Calculation formula of coal seam permeability | | | | |
|---|---|---|---|---|
| Conversion formula | $T_N$ | a | b | Calculation formula |
| $A = \dfrac{q \cdot r_1}{p_0^2 - p_1^2}$ $B = \dfrac{4 \cdot p_0^{1.5} \cdot t}{\alpha \cdot r_1^2}$ $T_N = B \cdot \lambda$ | $10^{-2}$-1 | 1 | −0.38 | $\lambda = A^{1.61} B^{\frac{1}{1.64}}$ |

TABLE 1-continued

Calculation formula of coal seam permeability

| Conversion formula | $T_N$ | a | b | Calculation formula |
|---|---|---|---|---|
| | 1-10 | 1 | −0.28 | $\lambda = A^{1.39} B^{\frac{1}{2.56}}$ |
| | 10-10² | 0.93 | −0.20 | $\lambda = 1.1 A^{1.25} B^{\frac{1}{4}}$ |
| | 10²-10³ | 0.588 | −0.12 | $\lambda = 1.83 A^{1.14} B^{\frac{1}{7.3}}$ |
| | 10³~10⁵ | 0.512 | −0.10 | $\lambda = 2.1 A^{1.11} B^{\frac{1}{9}}$ |
| | 10⁵~10⁷ | 0.344 | −0.065 | $\lambda = 3.14 A^{1.07} B^{\frac{1}{14.4}}$ |

During calculation, a value $\lambda$ is firstly obtained by selecting any formula, and then, a calculation result is substituted into $T_N = B \times \lambda$. If the value $T_N$ is consistent with the range of the value $T_N$ in the selected formula, the formula is correctly selected. If inconsistent, the appropriate formula may be found according to a range of the calculated value $T_N$.

Parts unmentioned in the present disclosure may be realized by referring to the prior art.

It is to be noted that any equivalent modifications or obvious variations made by those skilled in the art under the teachings of the present specification shall be encompassed in the scope of protection of the present disclosure.

The invention claimed is:

1. A steeply-inclined ultra-thick coal seam gas control method based on a binary composite liquid, comprising the following steps:
   at step a, preparing the binary composite liquid comprising a clean fracturing fluid system and a microemulsion, wherein,
   the clean fracturing fluid system uses a worm-like micelle formed by mixing a cetyl trimethyl ammonium bromide solution and a sodium salicylate solution as a fracturing fluid base solution, potassium chloride as a stabilizer, and a mixture of lubricating oil and water as a gel breaker;
   a method of preparing the microemulsion comprises: adding a sodium dodecyl sulfate (SDS) surfactant, an ethanol cosurfactant and kerosene into water; performing a centrifugation test according to the Young's equation and characterizing a wetting effect by a wetting contact angle; and selecting an ingredient blending ratio range at the time of best effect of the microemulsion by comparing contact angles of water-coal, SDS-coal and emulsion-coal to determine the most appropriate microemulsion, and mixing the selected microemulsion with the clean fracturing fluid system into the binary composite liquid;
   at step b, injecting the binary composite liquid into a coal mass by means of a hydraulic fracturing method and a water jet slotting method to form a coal mass gas extraction system of binary composite liquid fracturing and permeability improvement; and
   at step c, performing investigation and analysis for a gas control effect of a steeply-inclined ultra-thick coal seam according to change characteristics and analysis of gas extraction flow rate, change characteristics and analysis of permeability coefficient of coal seam, change characteristics and analysis of gas natural desorption speed of coal mass, change characteristics and analysis of gas concentration of return air flow of working face and theoretical analysis of drilling cuttings index, so as to realize gas control of the steeply-inclined ultra-thick coal seam:
   at step a, the method of determining the most appropriate microemulsion comprises:
   grinding and adding the SDS surfactant into a container holding warm distilled water, and stirring the solution thoroughly to complete dissolution of the SDS surfactant, so as to prepare an SDS solution with a mass fraction being 1%; and
   mixing ethanol, distilled water, the SDS solution and kerosene at a certain ratio at room temperature for 1 hour to allow the four substances to spontaneously form a transparent and homogenous microemulsion, wherein microemulsion synthesis is performed in batches at water-oil ratios of 2:1, 1:2 and 1:1 respectively to prepare transparent microemulsions of oil-in-water type, water-in-oil type and bi-continuous type;
   a method of preparing coal samples comprises: crushing raw coal and then pulverizing the raw coal using a pulverizer, and then screening the pulverized raw coal to obtain coal powder with particle sizes being 20 meshes, 120 meshes and 325 meshes, weighing 0.6 g of coal powder using a balance, placing the coal powder into a mould of a cake press and then compacting the coal powder with a force of 20 Mpa to obtain a coal cake, and repeating the pressing procedure to obtain a plurality of to-be-tested coal cakes with different particle sizes;
   wetting characteristics of the three-phase microemulsions are compared through centrifugation test and contact angle measurement in a laboratory to select a microemulsion with a small contact angle and the best wettability as the most appropriate microemulsion.

2. The steeply-inclined ultra-thick coal seam gas control method based on a binary composite liquid according to claim 1, wherein the concentration of the cetyl trimethyl ammonium bromide solution is 1%-5%, the concentration of the sodium salicylate solution is 0.5%-4.5%, and the addition amount of potassium chloride is 1%-5% of the weight of the fracturing fluid base solution.

3. The steeply-inclined ultra-thick coal seam gas control method based on a binary composite liquid according to claim 1, wherein at step b, the fracturing system in the hydraulic fracturing method comprises a fracturing pump, a water tank, a pressure gauge, a stop valve, a flowmeter, a pressure sensor and a special borehole packer, wherein the pressure sensor and the flowmeter are used to monitor a flow rate, an instantaneous pressure amount and an accumulative pressure amount in a pipe, and the fracturing pump pumps water in the water tank into a borehole through the pipe.

4. The steeply-inclined ultra-thick coal seam gas control method based on a binary composite liquid according to claim 3, wherein during water jet slotting, a drilling-cutting integrated drill bit is selected, wherein the drilling-cutting integrated drill bit comprises a drill rod, a reaming drill bit, a control device, a drill bit, a nozzle, a control valve and a water outlet, the control device is located between the reaming drill bit and the drill bit, the control valve is located in the control device, and the control device controls opening and closing of the pipe through the control valve.

* * * * *